Aug. 2, 1966 W. R. SMITH 3,264,487

MAGNETIC LOGIC CIRCUIT

Filed Nov. 7, 1962 3 Sheets-Sheet 1

INVENTOR.
W. R. SMITH
BY Forest B. Hitchcock
HIS ATTORNEY

MAGNETIC LOGIC CIRCUIT

Filed Nov. 7, 1962 3 Sheets-Sheet 2

INVENTOR.
W.R. SMITH
BY Forest B. Hitchcock
HIS ATTORNEY

INVENTOR.
W. R. SMITH
BY Forest B. Hitchcock
HIS ATTORNEY 3,264,487

MAGNETIC LOGIC CIRCUIT

Willis R. Smith, Rochester, N.Y., assignor to General Signal Corporation

Filed Nov. 7, 1962, Ser. No. 236,004
12 Claims. (Cl. 307—88)

This invention relates to logic circuits, and more particularly, to logic circuits for providing NOT and AND-NOR logic using magnetic transfer circuits.

In the design of switching circuits, need often arises for provision of an AND-NOR function. This function, basically, indicates that a load is energized when none of the units energizing the load are actuated. Various electronic circuits have heretofore been proposed for performing the AND-NOR function. However, need has existed for a reliable circuit for performing AND-NOR functions requiring only passive elements of one type, such as magnetic cores, for its operation. Increased reliability of operation results from such a circuit.

The present invention is directed to a circuit using apertured magnetic cores for performing the logical AND-NOR function electronically. The circuit utilizes an input unit and any number of NOT units in order to actuate an output unit. Each unit used in the circuit is made up of a pair of apertured ferrite cores comprising a magnetic transfer circuit. The ferrite cores are characterized by substantially square hysteresis loops. The cores are small, light and rugged, and can easily be made relatively insensitive to adverse atmospheric conditions. In addition, they require minimal amounts of energy for switching.

Generally speaking, the invention contemplates a switching circuit for setting a ferrite core and thereby producing an output only when an input is applied to a first core of the input unit and no input is applied to the first core of any of the NOT units and the first core of the output unit. Each unit of the AND-NOR circuit comprises a pair of apertured ferrite cores. Clock pulses of constant frequency are applied to the first core in a direction so as to clear the core and to the second core in a direction so as to set the core. Clock pulses of the same frequency but different phase are applied to the second core in a direction so as to clear the core and to the first core in a direction so as to set the core. Output pulses are coupled between the cores in each unit, in a direction so as to inhibit setting of the core to which it is applied. Outputs may be coupled from either of the cores, although a NOT unit output is coupled from the second core only.

The signal coupled from the first core of the input unit is connected in series opposition with the output of the first core of each NOT unit to the second core of the output unit. Thus, in the absence of external signals applied to the first core of any NOT unit, an input signal applied to the AND-NOR circuit inhibits the second core of the output unit, which in turn sets the first core of the output unit.

One object of this invention is to provide a logic circuit for performing AND-NOR functions, utilizing passive circuit elements of one type only.

Another object is to provide a magnetic switching circuit wherein an output is produced only upon absence of external input to the various elements of the circuit.

Another object is to provide a magnetic transfer circuit wherein output pulses are produced on a first pair of output terminals when a first input is applied to the circuit, and an output signal is produced on a second pair of output terminals when an input signal is applied to a second pair of input terminals.

Another object is to provide a transfer circuit wherein pulses of a constant frequency and phase are produced upon application of a first input signal and pulses of the same frequency but different phase are produced upon application of a second input signal.

Another object is to provide an AND-NOR circuit comprising NOT units utilizing apertured magnetic cores, wherein absence of external input to all of the NOT units causes setting of an output core upon application of an input signal to the circuit.

Another object is to provide a high-speed AND-NOR switching circuit having minimal power requirements.

These and other objects and advantages of the invention will become apparent from the following description when read in conjunction with the accompanying drawings in which.

Figure 1:
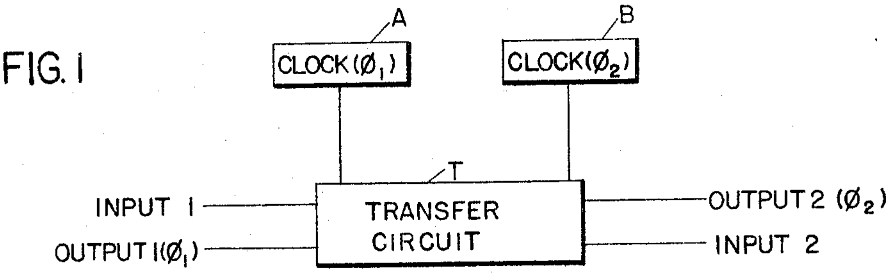
FIG. 1 is a block diagram of a basic magnetic transfer circuit incorporated in the invention.

Referring now to FIG. 1 for a basic description of the invention, a pair of clock generators A and B are shown connected to the transfer circuit T. Clock A produces constant frequency pulses of phase $\phi_1$ while clock B produces constant frequency pulses of the same frequency but different phase, $\phi_2$. Transfer circuit T also has two input circuits, input 1 and input 2, and two output circuits, output 1 and output 2.

In operation, clock generators A and B each generate a steady train of output pulses. These pulses are applied to transfer circuit T. With no signal applied to either input 1 or input 2, output pulses appear either at output 1 or output 2, depending upon the instant at which connection is made to the transfer circuit. This feature may be utilized as an integrity check to signify that the circuit is operative even when no input signal has been applied. For illustrative purposes, assume that output pulses appear at output 2. These pulses are then of phase $\phi_2$. This condition is illustrated graphically in FIG. 3.

Now assume a set pulse is applied to input 1. This halts production of output pulses at output 2, and starts production of output pulses on output 1. The pulses produced at output 1 are of phase $\phi_1$. These pulses then continue until a set pulse is next applied to input 2, at which time output pulses are no longer produced on output 1 and output 2 resumes production of output pulses having phase $\phi_2$. The circuit therefore operates to transfer output signals from output 1 to output 2, and back again, depending upon which input is set, and the polarity of energization.

Again assume output pulses appear at output 2. If now an inhibit pulse is applied to input 2, pulses at output 2 are halted, and pulses at output 1 are produced. If an inhibit pulse is next applied to input 1, output 1 halts production of output pulses and output 2 resumes output pulse production. The circuit again transfers output signals from output 1 to output 2, and back again, depending upon which input is inhibited. Thus, polarity of energization and selection of the core to be energized are the controlling factors in transfer of output signals between outputs of the transfer circuit.

Figure 2:
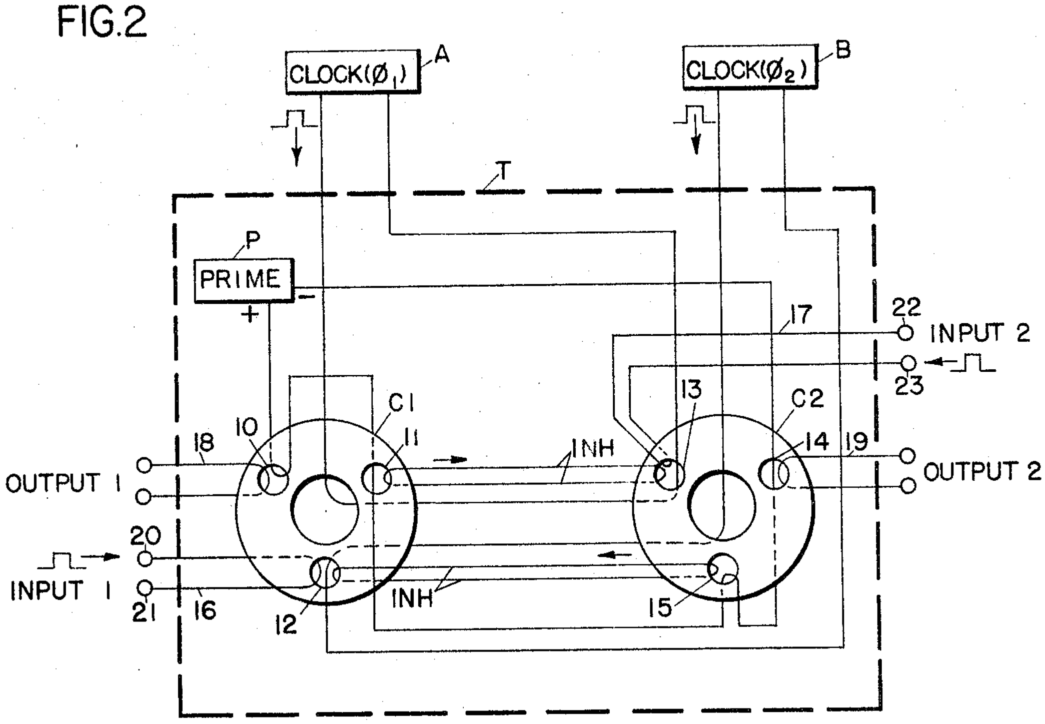
FIG. 2 is a schematic diagram of the basic magnetic transfer circuit of FIG. 1.
Figure 3:
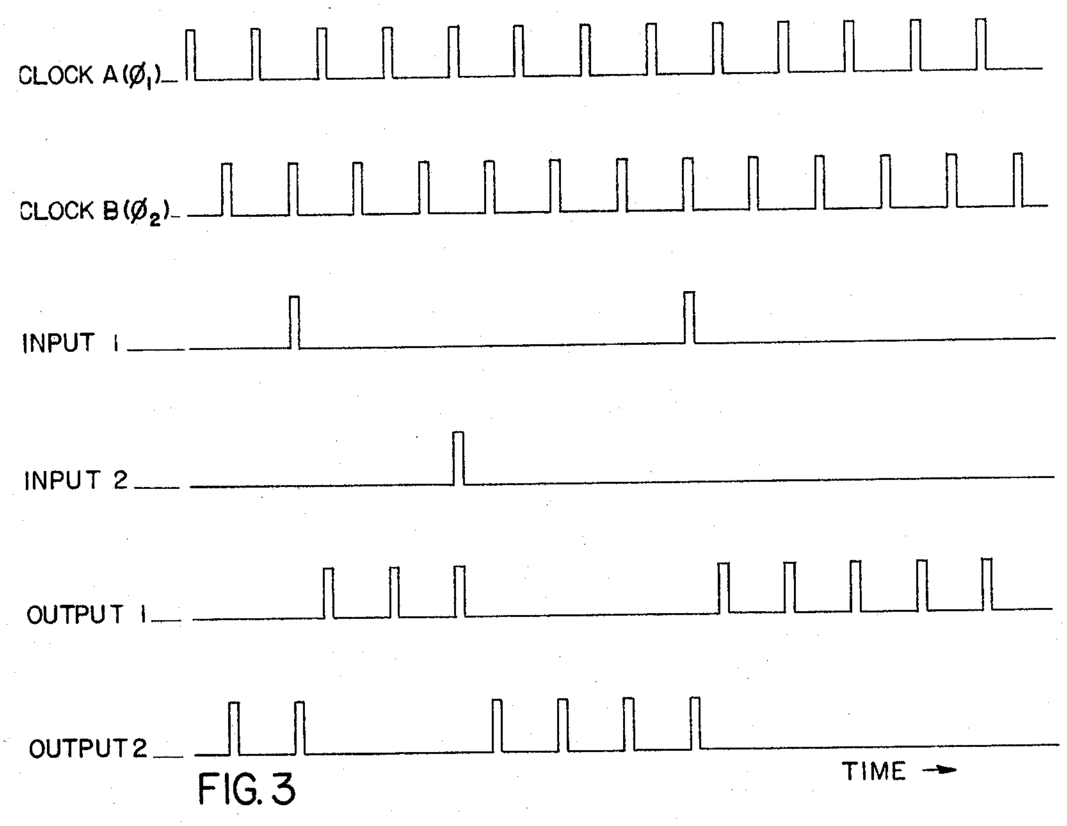
FIG. 3 is a graphical illustration of the phase of pulses produced by a pair of clock generators driving the cores of FIG. 2 which are switched by set pulses.

Referring now to FIG. 2, for a more detailed description of the invention, a pair of apertured ferrite cores C1 and C2 are shown, each having a major aperture and three minor apertures. Clock generator A couples pulses of phase $\phi_1$ and constant frequency through the major aperture of core C1 in a direction so as to clear core C1, and through minor aperture 13 of core C2 in a direction so as to set core C2. Correspondingly, clock generator B coupled pulses of phase $\phi_2$ and constant frequency through the major aperture of the core C2 in a direction so as to clear core C2, and through minor aperture 12 of core C1, in a direction so as to set core C1. Although the frequency of clock generator A is identical to that of clock generator B, the pulses produced by these generators are shifted in phase, as previously explained, and as illustrated in FIG. 3.

Output minor aperture 11 of core C1 is coupled to input minor aperture 13 of core C2 in a direction tending to inhibit setting of core C2 through minor aperture 13. Output minor aperture 15 of core C2 is coupled to input minor aperture 12 of core C2 in such direction as to inhibit setting of the core C1 through minor aperture 12. An input winding 16 having terminals 20 and 21 is coupled through input minor aperture 12 of core C1, while an input winding 17 having terminals 22 and 23 is coupled through input minor aperture 13 of core C2. An output winding 18 is coupled through output minor aperture 10 of core C1, for producing the signal designated output 1, while output winding 19 is wound through output minor aperture 14 of core C2, for producing the signal designated output 2.

In order to provide a NOT function, output of the transfer circuit must be taken from the core which does not receive the input signal. Thus, if a set pulse is applied to winding 16, making terminal 20 positive with respect to terminal 21, no output appears on output winding 19. Hence, when winding 16 represents a set input, winding 19 represents the output of the NOT circuit. Similarly, if a set pulse is applied to winding 17, making terminal 23 positive with respect to terminal 22, the signal appearing on winding 18 represents the NOT circuit output.

On the other hand, if an inhibit pulse is applied to winding 16, making terminal 21 positive with respect to terminal 20, output pulses appear on winding 19, while if an inhibit pulse is applied to winding 17, making terminal 22 positive with respect to terminal 23, output pulses appear on winding 18. Thus, if inhibit pulses are used as inputs to the NOT circuit, rather than set pulses, mode of operation remains substantially the same.

A prime generator P, which may be any suitable source of direct current, is coupled to core C1 through minor apertures 10 and 11 and to core C2 through minor apertures 15 and 14, respectively. The polarity of prime current is such that it tends to prime the apertures to which it is coupled.

In considering operation of the circuit of FIG. 2 assume first that no signal is applied to windings 16 and 17. Assume further that both cores C1 and C2 are clear. Next assume that a pulse is first applied from clock A, as shown in FIG. 3. This pulse has no effect on core C1, which is already clear, but in passing through minor aperture 13 of core C2, it sets core C2. As seen in FIG. 3, a pulse is next applied from clock B. This pulse clears core C2 and tends to set core C1 through minor aperture 12. However, on clearing core C2, a pulse is produced at output minor aperture 15 of core C2 which is coupled to input minor aperture 12 of core C1. This pulse travels in a direction opposite to the pulse from clock B through minor aperture 12. Therefore, the effect of the pulse from clock B in passing through minor aperture 12 is nullified, and core C1 thus remains clear. On the next output pulse from clock A, the cycle repeats. The ultimate result is that core C2 provides output pulses on winding 19 when no input is applied to windings 16 and 17. This is graphically illustrated in FIG. 3.

Now assume an input pulse of sufficient amplitude to set core C1 is applied to winding 16. When a pulse is thereafter produced by clock A, it clears core C1, producing a pulse at output minor aperture 11. The ampere-turns produced by this pulse are coupled to input minor aperture 13 of core C2, in such direction as to inhibit setting of core C2 by the ampere-turns produced by the clock A pulse, which pulse is also coupled through minor aperture 13. Simultaneously, an output pulse is produced on winding 18 coupled through output minor aperture 10 of core C1. When a clock B pulse is next produced, no output is coupled from minor aperture 15 of core C2 to minor aperture 12 of core C1, because core C2 had not been set prior to being cleared. Thus, the clock B pulse coupled through minor aperture 12 of core C1 causes core C1 to become set. Again, the next clock A pulse produces an output from winding 18 and simultaneously produces an output from minor aperture 11 which inhibits setting of core C2 by the clock A pulse passing through minor aperture 13. Thus, a single input pulse applied to winding 16 results in continuous output pulses on winding 18 at the frequency of the clock generators and of phase $\phi_1$. This condition is graphically illustrated in FIG. 3.

If an input signal is applied to winding 17 coupled to core C2, similar results are obtained. Thus, an input signal on winding 17 sets core C2. Occurrence of a clock B pulse then clears core C2 producing an output at minor aperture 15 which is coupled to minor aperture 12 of core C2 producing an output at minor aperture 15 which is coupled to minor aperture 12 of core C1. The ampere-turns produced by the pulse coupled to minor aperture 12 counteract the ampere-turns produced by the pulse from clock generator B through minor aperture 12, thereby preventing setting of core C1. Simultaneously, an output is produced on winding 19, coupled to core C2 through output minor aperture 14. Upon occurrence of the next clock A pulse, no output is produced at minor aperture 11 of core C1, since core C1 is in the clear condition. However, the clock A pulse is also coupled through minor aperture 13 of core C2, thereby setting core C2 due to absence of a counteracting signal from minor aperture 11 of core C1. The next clock B pulse then clears core C2, again producing output pulses at minor apertures 14 and 15 of core C2. The frequency of these pulses is identical to that of the clock generators, while being of phase $\phi_2$. This condition also is graphically illustrated in FIG. 3.

Examining the operation of FIG. 2 as graphically illustrated in FIG. 3, it is seen that when a set input is applied to core C1, no output is produced at core C2. Correspondingly, when a set input is applied to core C2, no output is produced at core C1. The transfer circuit of FIG. 2 may therefore also be considered bilateral NOT circuit; that is, a set input applied to either side of the circuit produces no output on the opposite side thereof. Obviously, it is possible to utilize only one output from the circuit and thereby convert the circuit to a unilateral NOT circuit. Unilateral NOT circuits can be utilized in many forms of circuit applications. One such form is illustrated in FIG. 4.

Figure 4:
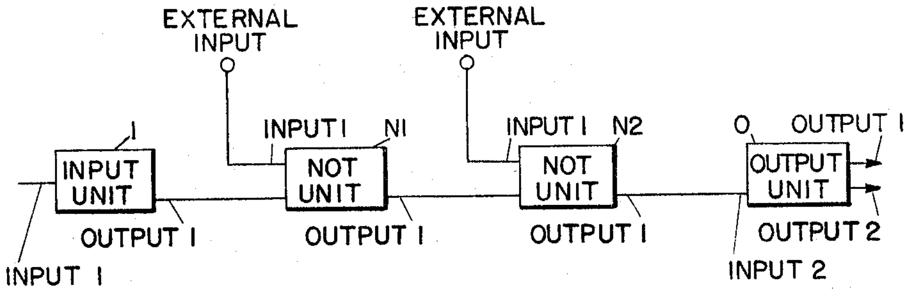
FIG. 4 is a block diagram of an elementary AND-NOR circuit.

Turning now to FIG. 4, an AND-NOR circuit is shown comprising an input unit I, an output unit O, and a plurality of NOT units N1 and N2 connected in series between the input unit I, and if no external signal is applied to NOT units N1 and N2, output unit O produces a signal at its output 1. If an external input signal is applied to any of the NOT units, the NOT unit receiving the external input signal prevents passage of the signal applied to its input from the preceding unit, so that output unit O produces no output signal at output 1, but instead produces an output signal at output 2. The circuit of FIG. 4 thus comprises an elementary AND-NOR circuit, since output 1 is produced only when input 1 of input unit I is fulfilled and none of the external inputs to the NOT units are fulfilled.

The AND-NOR circuit is made up exclusively of transfer circuits as illustrated in FIG. 1. Thus, the first stage, input unit I, utilizes input 1 and output 1; the final stage, output O, utilizes input 2 and outputs 1 and 2; and the intermediate stages, NOT units N1 and N2, utilize input 1 and output 1.

Figure 5:
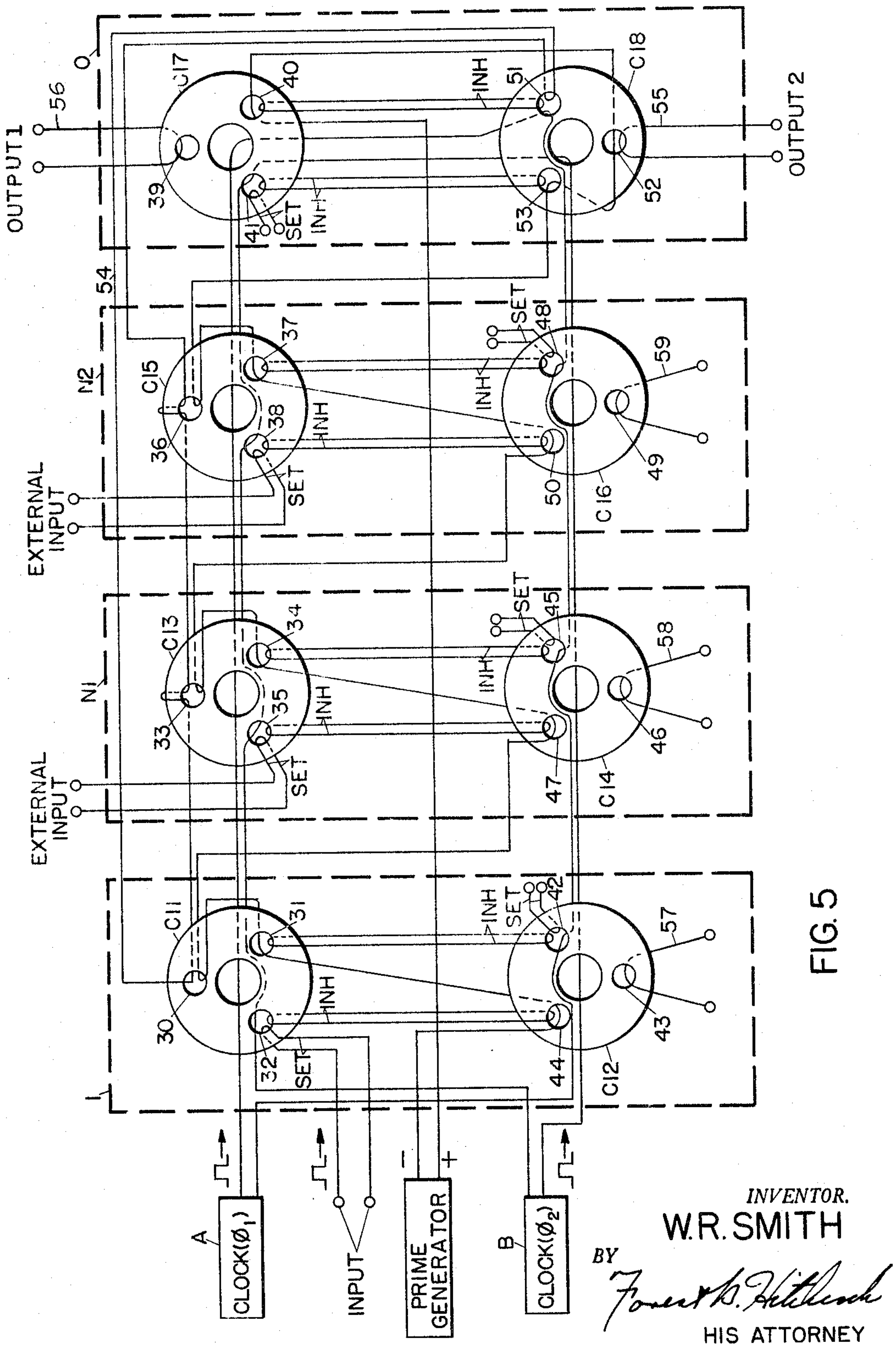
FIG. 5 is a schematic diagram of an AND-NOR circuit incorporating the circuit embodiment of FIG. 2.

Turning now to FIG. 5 for a more detailed description of the AND-NOR circuit of FIG. 4, the circuit is shown comprising transfer units illustrated in FIG. 2. Cores C11, C13, C15 and C17 correspond to core C1 of FIG. 1 being cleared by clock generator A and set by clock generator B. Cores C12, C14, C16 and C18 correspond to core C2 of FIG. 1 being cleared by clock generator B and set by clock generator A.

Although output of core C11 from minor aperture 30 is coupled to minor aperture 51 of core C18 in such direction as to inhibit setting of core C18, the output of core C11 is connected in series opposition with outputs from minor apertures 33 and 36 of cores C13 and C15 respectively, thereby tending to set core C18 through minor aperture 51. Thus, in order to set core C18 through minor aperture 51, either core C13 and C15 must be set; output of the circuit may then be taken from output winding 55 wound through minor aperture 52 of core C18.

A loop 54 couples minor apertures 30, 33, 36 and 51 of cores C11, C15 and C18 respectively. To enable either core C13 or C15 to set core C18 when core C11 is set, the ratio of turns of loop 54 through either minor apertures 33 or 36 to the times of loop 54 through minor aperture 30 is selected to be greater than unity. This permits current induced in loop 54 from either cores C13 or C15 to exceed current induced in the loop from core C11, so that net current in loop 54 when core C11 and either or both cores C13 and C15 are set is in a direction to set core C18 through minor aperture 51. The aforementioned turns ratio can be, for example 2 to 1, for proper circuit operation.

Each pair of cores comprising a unit of the AND-NOR circuit of FIG. 5 need only utilize but one of the plurality of outputs of which it is capable. Thus, the pairs of cores of units N1, N2, and any other similar units which may be interposed between the input and output units, function as unilateral NOT circuits. In the input unit, the input signal is applied to the same core from which the output signal of the unit is taken, while in the output unit the output signal is taken from either core, depending upon polarity of signal applied to aperture 51 from loop 54.

The NOT units are connected between the input pair of cores, C11 and C12, and the output pair of cores, C17 and C18. When an input signal is applied to the circuit, core C11 becomes set through minor aperture 32. Setting of cores C14 and C16 prior to application of an input pulse to minor aperture 32 of core C11 causes cores C13 and C15 to remain clear, since pulses produced by core C11 tend to inhibit cores C13 and C15 through which they pass, in a manner similar to that explained in connection with FIG. 2. Input to the circuit thus provides pulses in loop 54 which are coupled to core C18 through minor aperture 51 in a direction so as to inhibit the core. Core 17 is periodically set, and output unit O thereby produces pulses on winding 56, which comprises output 1.

If either core C13 or C15 becomes set, voltage pulses are produced through minor apertures 33 or 36 respectively in a direction so as to oppose and exceed voltage pulses produced from minor aperture 30 of core C11. This is because of the aforementioned 2 to 1 ratio of turns in loop 54 through minor aperture 33 or 36 to turns in loop 54 through minor aperture 30. In such case, current pulses are coupled through loop 54 to minor aperture 51 of core C18, setting core C18, thus clearing core C17 and thereby transferring output pulses from output 1 to output 2. In the event that both cores C13 and C15 become set, pulses will still be produced in loop 54 in a direction so as to set core C18 through minor aperture 51. Again, core C17 will clear and output pulses will be transferred from output 1 to output 2.

Although output windings 57, 58 and 59 are shown on minor apertures 43, 46 and 49 respectively, of cores C12, C14 and C16 respectively, the need for such windings does not normally arise in this circuit. They may be connected, however, to provide, for example, a signal indicative of the condition of both cores in each unit of the circuit, if so desired. Furthermore, a set pulse applied to the external input terminals of any NOT unit reverses direction of current flow through loop 54 by setting the odd-numbered core and thereby clearing the even-numbered core of the unit. This also halts AND-NOR circuit output on winding 56.

The AND-NOR circuit therefore produces a train of output pulses on output winding 1 when an input pulse applied to the input terminals is of such polarity as to set core C11 when cores C14 and C16 are already set. The output 1 pulse train continues indefinitely, until core C12, C13, or C15 is set through minor aperture 42, 35, or 38 respectively. The circuit includes a plurality of coupled NOT units interposed between input and output terminals, so that application of an external input to any of the NOT units prevents the input applied to the AND-NOR circuit from producing an output pulse train at a predetermined pair of output terminals. The logic thus provided by the circuit indicates that when an output is produced, no external signal is applied to any of the NOT units.

Thus, there has been shown a novel AND-NOR circuit comprising a plurality of pairs of apertured ferrite cores. Each pair of cores comprises a versatile transfer circuit capable of functioning as a bilateral NOT circuit, wherein a single pulses applied to a first core in the circuit causes a train of pulses to be produced from the first core in the circuit. In order to produce the pulse train from the second core, a single input pulse need merely be applied to the input terminals of the second core. By removing or simply not using one of the two output pairs of terminals provided on the transfer circuit, the transfer circuit can be made to function as a NOT circuit. The NOT circuit is then used as a building block for constructing the novel AND-NOR circuit.

The novel AND-NOR circuit is compact and fast-acting, with minimal power requirements. It readily lends itself to use with magnetic logic circuits as well as any other form of logic circuit requiring use of AND-NOR circuits. Moreover, individual NOT circuits, of themselves, may also be used with magnetic or other types of logic circuits. By using standard, readily available passive components of a single type, namely, apertured ferrite cores, the circuit can be quickly and easily constructed.

Although, but several specific embodiments of the present invention have been described, it is to be specifically understood that these forms are selected to facilitate in disclosure of the invention rather than to limit the number of forms which it may assume; various modifications and adaptations, may be applied to the specific forms shown to meet requirements of practice, without in any manner departing from the spirit or scope of the invention.

What I claim is:

1. In a magnetic switching circuit, the combination comprising a pair of multiple aperture ferrite cores, setting means coupled to each core through a first minor aperture therein, and means coupling each core through a second minor aperture therein to the other core through said first minor aperture therein in a direction to inhibit setting of said other core when said each core is set, said setting means providing sufficient ampere-turns to overcome inhibiting ampere-turns wound through said first minor aperture in either core, and means coupling pulses through a major aperture of each core, said last-named means being coupled to the setting means of the other core.

2. An AND-NOR circuit comprising a plurality of pairs of apertured magnetic cores, means clearing a first core in each pair with pulses of predetermined frequency and phase, means clearing the second core in each pair with pulses of said frequency but different phase, means coupling output of each core in each pair to the other core in said pair in a direction to inhibit setting of said other core, an output core, pulse producing means and means coupling said pulse producing means to the first core of each pair and to the output core in a direction to inhibit setting the output core only when the first core of each pair is clear.

3. An AND-NOR circuit comprising pairs of apertured magnetic cores including an input pair, an output pair, and phase, means clearing the second core in each pair clearing a first core in each of the pairs, second pulse generator means clearing the second core in each of the pairs, means coupling said first and second cores to each other in a direction to inhibit setting either of the cores, means coupling pulses from the first core of the input pair to the second core of the output pair in a direction to inhibit setting the second core of the output pair, and means coupling the first core of each of the NOT pairs to said means coupling pulses from the first core of the input pair whereby setting of any of the first cores in the NOT pairs produces pulses of polarity to set the second core of the output pair.

4. A magnetic transfer circuit including first and second multiple aperture magnetic cores, means threading a first train of pulses through a first aperture of the first core, means threading a second train of pulses through a first aperture of the second core, first output means threading output pulses produced by the first core through a second aperture of the second core, and second output means threading output pulses produced by the second core through a second aperture of the first core, whereby an external input signal threaded through the second aperture of the first core produces pulses in phase with the first train of pulses on the first output means and an external input signal threaded through the second aperture of the second core produces pulses in phase with the second train of pulses on the second output means.

5. The method of providing output pulses from a transfer circuit driven by a pair of pulse generators having identical frequency and different phase comprising the steps of clearing a first magnetic core with pulses from one of the sources, clearing a second magnetic core with pulses from the other of the sources, setting the first core with a single imput pulse inhibiting setting the second core with an output pulse inductively generated by the first core, and thereafter setting the first core with each pulse clearing the second core.

6. A magnetic switching system comprising a plurality of pairs of apertured ferrite cores, circuit means providing a train of pulses of predetermined polarity upon application of input energy thereto, and conductor means coupling the circuit means to an output core of one pair of said plurality in a direction to inhibit setting the output core with each of the pulses, said conductor means further coupling the first core of each of the remaining pairs of said plurality to the circuit means in a direction to induce pulses of opposite polarity to those of said train and a greater magnitude that those of said train upon application of an external input signal to any of said remaining pairs of cores whereby said output core is set by each of said pulses of opposite polarity.

7. A magnetic switching system comprising at least first and second apertured ferrite cores, circuit means providing a train of pulses upon application of an input signal thereto, first means coupled to said first core for setting said first core, second means coupled to said first core for priming said first core, third means coupled to said first core for clearing said first core, and means coupling said circuit means to each of said cores in a direction to inhibit setting said second core with said pulses while said first core is clear and to set said second core with pulses produced by said first core when said first core is set.

8. A magnetic switching system comprising a plurality of apertured ferrtie cores, an output core in addition to said plurality, circuit means providing a train of pulses upon application of input energy thereto, means coupled to each core of said plurality for setting said each core, means coupled to each core of said plurality for priming said each core, means coupled to each core of said plurality for clearing said each core, and means coupling said circuit means to each core of said plurality and to said output core in a direction to inhibit setting said output core with said pulses while each core of said plurality is clear and to set said output core with pulses produced by any core or said plurality when said any core is set.

9. A bilateral NOT circuit comprising first and second apertured magnetic cores, each core including a major aperture and a plurality of minor apertures therein, first conductor means threading pulses of predetermined frequency and a first phase through the major aperture of the first core, second conductor means threading pulses of said frequency and a second phase through the major aperture of the second core, first input means threading a first minor aperture of the first core, second input means threading a first minor aperture of the second core, first output means threading a second minor aperture of the first core, second output means threading a third minor aperture of the first core, third output means threading a second minor aperture of the second core, fourth output means threading a third minor aperture of the second core, means coupling the first output means to the second input means, and means coupling the third output means to the first input means, whereby a signal applied to the first input means produces pulses of said frequency and first phase on the first and second output means and no signal on the third and fourth output means, and a signal applied to the second input means produces pulses of said frequency and phase on the third and fourth output means and no signal on the first and second output means.

10. The bilateral NOT circuit of claim 9 having additional means coupling the first conductor means to the second input means in a direction to set the second core, and additional means coupling the second conductor means to the first input means in a direction to set the first core.

11. A transfer circuit comprising first and second sources of pulses, a first ferrite core magnetically coupled to the first source of pulses and adapted to be cleared thereby, a second ferrite core magnetically coupled to the second source of pulses and adapted to be cleared thereby, means adapted to inhibit setting the first core upon energization thereof, means adapted to inhibit setting the second core upon energization thereof, means adapted to set the first core upon energization thereof, means adapted to set the second core upon energization thereof, first output means magnetically coupled to said first core, second output means magnetically coupled to said second core, said second output means being electrically isolated from said first output means, means connecting said first output means to said means adapted to inhibit setting the second core, and means connecting said second output means to said means adapted to inhibit setting the first core, whereby the set condition of the first core inhibits setting the second core and the set condition of the second core inhibits setting the first core.

12. The transfer circuit of claim 11 including:

means connecting the first source of pulses to the means adapted to set the second core and means connecting the second source of pulses to the means adapted to set the first core.

References Cited by the Examiner

UNITED STATES PATENTS

| | | | |
|---|---|---|---|
| 2,802,202 | 8/1957 | Lanning | 340—174 |
| 2,874,373 | 2/1959 | Hall | 340—174 |
| 2,995,735 | 8/1961 | Frank | 340—174 |

BERNARD KONICK, *Primary Examiner.*

IRVING L. SRAGOW, *Examiner.*

S. M. URYNOWICZ, *Assistant Examiner.*